United States Patent
Bowen et al.

[19]

[11] Patent Number: 6,150,650
[45] Date of Patent: Nov. 21, 2000

[54] VARIABLE GAIN IMAGE INTENSIFIER

[75] Inventors: James H. Bowen, Salem; Walter E. Blouch, Roanoke; Mark A. Bryant, Roanoke; Roger D. Whiddon, Roanoke, all of Va.; Richard A. Kominsky, Westfield; Ronald E. Champagne, Blanford, both of Mass.

[73] Assignees: ITT Manufacturing Enterprises, Inc., Wilmington, Del.; K and M Electronics, Inc., West Springfield, Mass.

[21] Appl. No.: 09/123,371

[22] Filed: Jul. 27, 1998

[51] Int. Cl.[7] .................................................. G02B 23/00
[52] U.S. Cl. .............................. 250/214 VT; 250/214 LA
[58] Field of Search ....................... 250/214 VT, 214 LA, 250/214 R; 359/353, 350, 399, 400, 402, 405, 407, 409, 418, 419, 809, 811, 815, 819

[56] References Cited

U.S. PATENT DOCUMENTS

| | | |
|---|---|---|
| 5,283,427 | 2/1994 | Phillips et al. ..................... 250/214 VT |
| 5,644,425 | 7/1997 | Palmer . |
| 5,737,131 | 4/1998 | Palmer . |
| 5,867,313 | 2/1999 | Schweitzer et al. ..................... 359/418 |
| 5,943,174 | 8/1999 | Bryant et al. ............................ 359/809 |

*Primary Examiner*—John R. Lee
*Attorney, Agent, or Firm*—McDermott, Will & Emery

[57] ABSTRACT

A method for providing user adjustable variable gain for a night vision device which utilizes an image intensifier tube, wherein the image intensifier tube has a given life expectancy, the image intensifier tube is subjected to factory calibration for providing an optimum output during operation, wherein the calibration undesirably differs from tube to tube and is adjustable by variable control means coupled to the tube, whereby when one tube is substituted for another the difference in calibration causes non-optimum performance, the method including the steps of: determining minimum and maximum gain limits associated with the optimum output of the night vision device; factory calibrating gain limiting means according to the determined minimum and maximum gain limits, wherein the gain limiting means are associated with the image intensifier tube and for limiting the variable control means; and, tethering the gain limiting means to the image intensifier tube.

20 Claims, 6 Drawing Sheets

VARIABLE GAIN IMAGE INTENSIFIER

RELATED APPLICATION

This application is related to commonly assigned application Ser. No. 09/098,098 entitled issued as U.S. Pat. No. 5,943,174 on Aug. 24, 1999, NIGHT VISION MONOCULAR DEVICE assigned to ITT Manufacturing Enterprises, Inc., the assignee herein and incorporated by reference.

FIELD OF INVENTION

This invention relates generally to electronic devices and, more particularly, to a variable gain image intensifier for a night vision device for improved night vision operation.

BACKGROUND OF INVENTION

Fixed-gain intensifier tubes have been used for many years in a variety of night vision systems, including binoculars, binoculars, monoculars, and weapon sights. Variable-gain tubes have received more limited application due to the size, weight, cost, and complexity penalties associated with implementing the variable gain features and controlling gain limits. Variable gain tubes have found their greatest use in driver's viewers, weapon sights, cameras, and commercial systems such as the UT Night Mariner binocular, where minimized size and weight are not critical.

Variable gain can be implemented by adjusting the light level into or out of the tube via an arrangement of filters or irises, as is done in intensified camera systems, for example. Variable gain can also be implemented electro-optically by filters whose transmissivity is adjustable by means of an applied voltage or current. Variable gain can also be implemented electrically by adjusting the magnitude or duty factor of one or more of the power supply voltages to the tube module.

Generally, the intensifier tube's light gain increases with increases in magnitude in any of its supply voltages. In camera systems, the cathode or microchannel plate (MCP) voltage is often gated at a variable duty factor to achieve variation in the time-averaged light output. The MCP voltage is often varied to achieve variable gain, as this voltage can be varied with minimal adverse impact to other factors such as tube resolution and life. Most so-called fixed-gain intensifiers include automatic brightness control (ABC), which reduces the MCP voltage under control of the power supply when the screen current reaches a preset threshold, in order to prevent excessive output brightness in conditions of brighter input light. User-adjustable gain is typically achieved by varying the MCP voltage via push-button or rotary control inputs from the user.

In systems such as the Night Mariner for example, push-button inputs cause a stored number in system memory to increase or decrease. The stored number is used with a digital-to-analog converter which produces an output control voltage proportional to the number. This voltage is used in the intensifier power supply as a reference voltage, to which a divided version of the MCP voltage is compared in an error amplifier. The output of the error amplifier controls the circuit which produces the MCP voltage, such that the MCP voltage is a fixed multiple of the adjustable control voltage. In other implementations of the power supply, the control voltage sets a limit on the level of an AC voltage which is subsequently stepped-up and rectified to produce the variable MCP voltage.

In some systems, such as the MX-1 1620 and MX-1 1619 25-mm intensifier tubes, the gain is varied by means of an external gain adjustment circuit (EGAC) which is a part of the viewer system or weapon sight system in which the tube is installed. The EGAC includes a user-adjustable potentiometer to enable setting the gain to any value between established limits. Inside the tube housing are two additional potentiometers which permit the upper and lower gain limits to be factory-set to specified values.

These potentiometers are typically part of the feedback or control network for the power supply which regulates the MCP voltage. Adjusting a potentiometer changes the level of feedback which in turn causes the magnitude of the MCP voltage to change.

The smallest intensifier tube in regular production is the MX-10160 tube, and commercial versions of the same, for use in AN/AVS-6 and similar night vision systems. The MX-10160 contains an integral power supply, potted with the intensifier tube module, in a cylindrical housing. However, this tube does not offer variable gain. The power supply in the MX-10160 does however contain a screwdriver-adjustable potentiometer used to factory-set the tube gain to a specified value. This potentiometer is part of the feedback network that controls the MCP voltage in the power supply.

Customers increasingly desire the variable gain feature in a small, lightweight package, such as a monocular. In systems which have interchangeable tubes, customers prefer that any tube be installable in any system and yet retain the same maximum and minimum gain limits, with no required adjustments. The ability to replace or interchange tubes without requiring gain limit adjustments means that maintainers can do their work faster and with less support equipment, reducing maintenance costs. While systems such as the MX-1 1620 and MX-1 1619 25-mm intensifier tubes offer variable gain, set limits, and interchangeability, these tubes are heavy and bulky, not suitable for hand-held or head-mounted use. Further, the Night Mariner does not offer interchangeable tubes, uses a relatively complex gain adjustment circuit, and is also too heavy and bulky for head-mounted use. In addition, it does not have any ability to set a limit on minimum gain. Likewise, intensified camera systems with variable gain are generally too heavy and bulky for head-mounted use, and do not offer interchangeable tubes.

SUMMARY OF THE INVENTION

A method for providing user adjustable variable gain for a night vision device which utilizes an image intensifier tube, wherein said image intensifier tube has a given life expectancy, said image intensifier tube is subjected to factory calibration for providing an optimum output during operation, wherein said calibration undesirably differs from tube to tube and is adjustable by variable control means coupled to the tube, whereby when one tube is substituted for another said difference in calibration causes non-optimum performance, said method including the steps of: determining minimum and maximum gain limits associated with said optimum output of said night vision device; factory calibrating gain limiting means according to said determined minimum and maximum gain limits, wherein said gain limiting means are associated with said image intensifier tube and for limiting said variable control means; and, tethering said gain limiting means to said image intensifier tube.

DETAILED DESCRIPTION OF THE INVENTION

This invention capitalizes on the small size and light weight of the MX-10160 tube, for example, and modifies the design of this unit to include the ability for the user to adjust the intensifier's gain to any desired value between specified upper and lower limits, which can be factory-preset. Further, by allowing these minimum and maximum preset limits to be factory preset, a certain degree of uniformity can be established between all interchangeable tubes.

The factory-preset tubes are interchangeable in systems, without requiring the maintainers to adjust the preset gain settings. This invention requires a minimum of modification to the MX-10160. Thus, the existing tooling for production and test can continue to be used, and implementation costs are held to a minimum.

In summary, two screwdriver-adjustable potentiometers are used to establish the two degrees of freedom necessary to allow both the maximum and minimum gain limits for a user variable gain to be factory-preset. Other adjustable elements such as electrically-programmable potentiometers or trimmable resistors could also have been used. However, the screwdriver-adjustable potentiometers were selected to retain as much compatibility with existing factory processes as possible.

There is no room inside the MX-10160 power supply for the additional potentiometer. Thus, the gain limit potentiometers in this invention are located on a small board external to the tube housing.

This board is tethered to the tube housing by wires in a first embodiment. In the first embodiment, the wires attach to the printed circuit board of the power supply in the area vacated by the original MCP voltage adjust potentiometer, and emerge directly from the potting of the tube and power supply housing.

Alternatively, this board is tethered to the tube housing by a flexible printed circuit board in a second embodiment. In this second embodiment, a two-pin header is preferably installed in the power supply in the area vacated by the original MCP voltage adjust potentiometer. During the assembly of the tube, the flexible printed circuit board assembly is soldered to the pins, and the connection is then covered by the backplate of the tube. Alternatively, the power supply could contain sockets instead of the header and the flexible printed circuit board could be adapted to plug into the sockets.

In any of these implementations, the potentiometer board is attached to the tube housing as one overall assembly, such that the preset maximum and minimum variable gain limits remain with the tube when the tube is replaced by maintainers. The tube, potentiometer board and either the connection wires or flexible circuit will hereinafter be referred to as the variable gain image intensifier assembly, as it can be removed by maintenance personnel, as one complete interchangeable unit.

Figure 6:
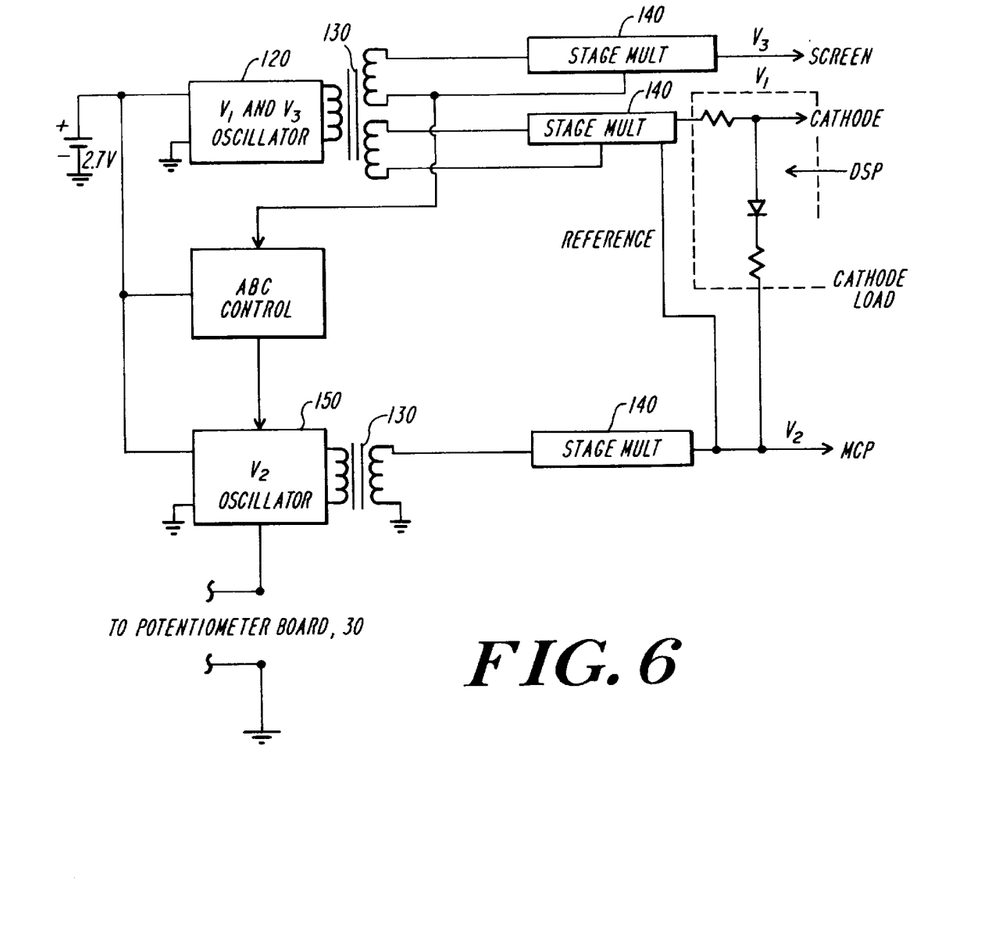
FIG. 6 is a block diagram of a powers supply for a night vision device according to the present invention.
Figure 11:
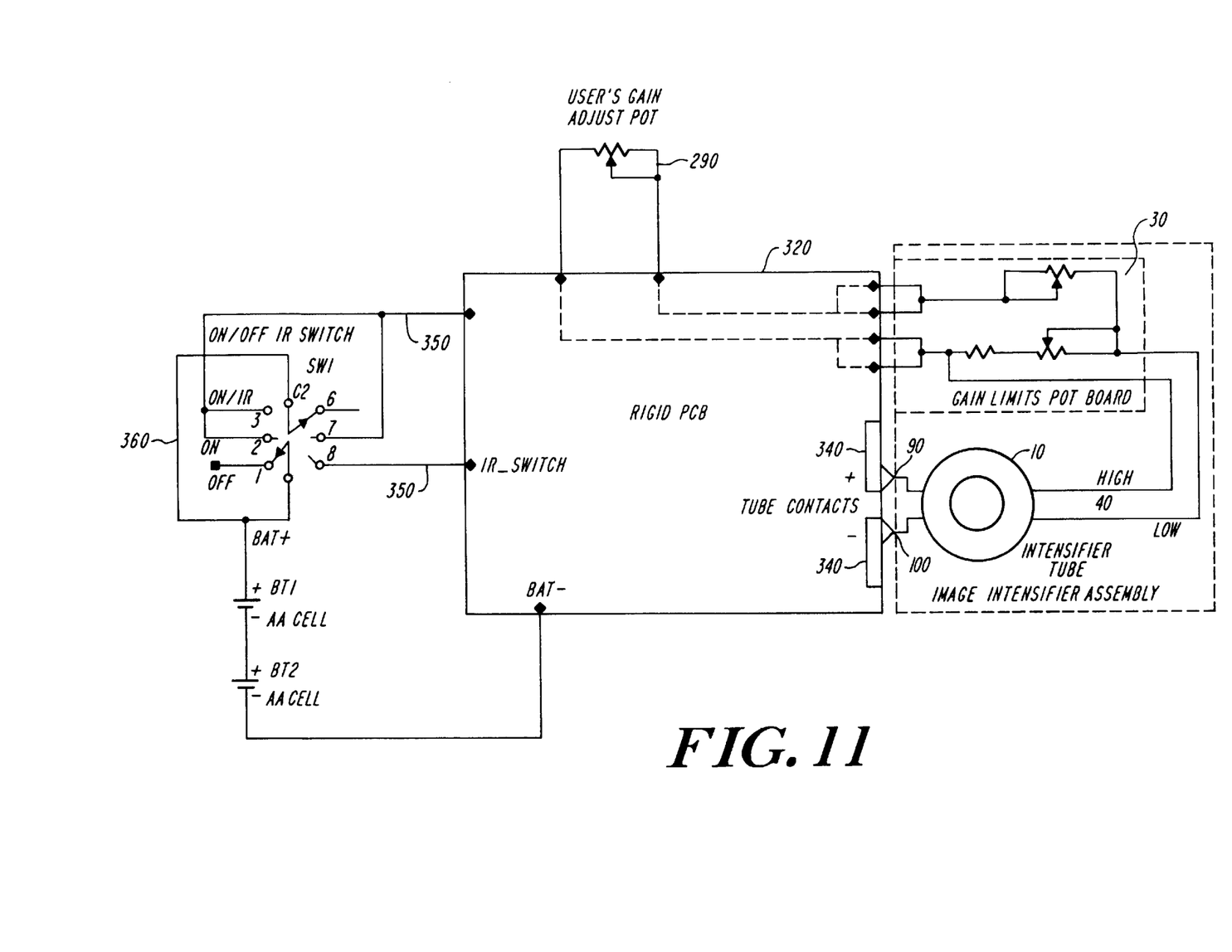
FIG. 11 is a block diagram illustrating the electronics of the night vision device of FIG. 10 interconnected to the variable gain image intensifier assembly according to the present invention.
Figure 12:
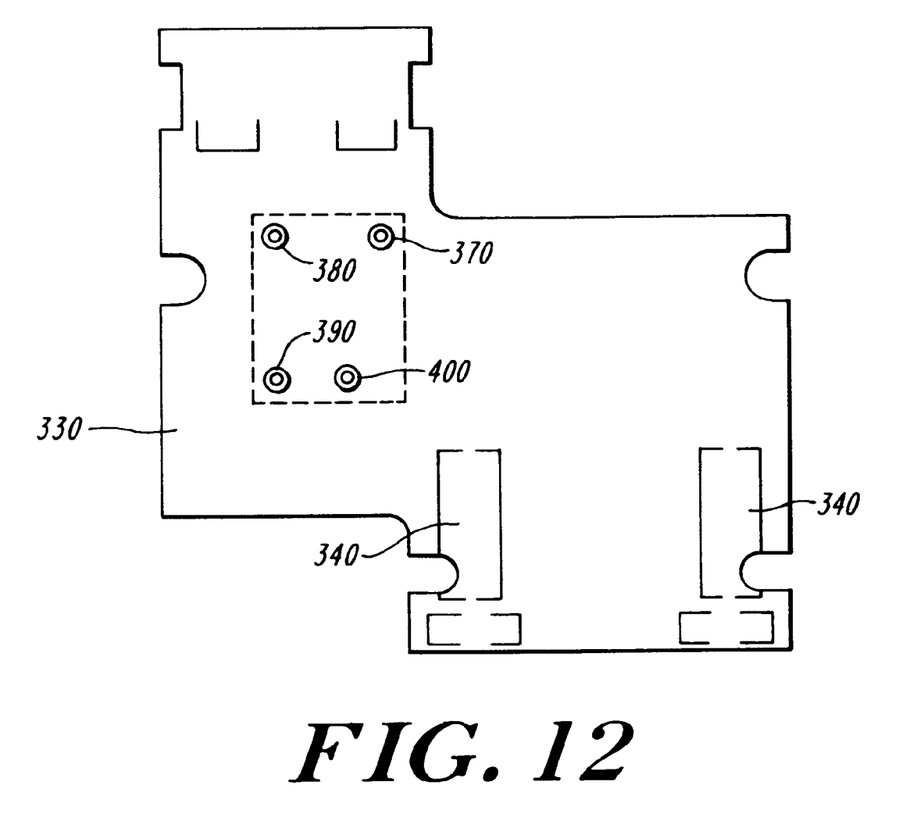
FIG. 12 is a top view of a board layout encompassing the electronics of the night vision device of FIG. 10.

In the system according to the present invention, the potentiometer board further plugs into a system circuit which includes the user-accessible gain adjustment control (see FIGS. 6 and 11–12 for example). The plug on the potentiometer board may consist of a two-pin header, however, preferably the plug consists of four pins which offer improved contact reliability and improved mechanical support. Alternatively, the potentiometer board can incorporate a socket or other suitable detachable electrical interconnection means.

Figure 1:
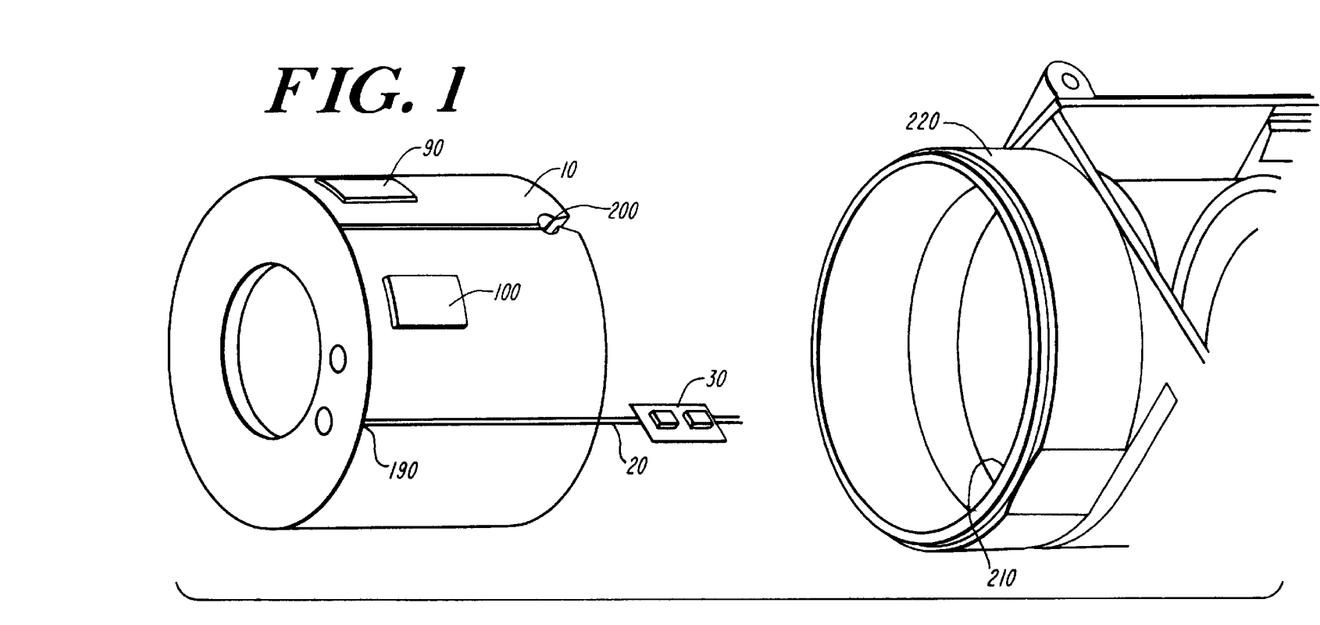
FIG. 1 is a perspective view of a night vision device intensifier tube incorporating variable gain according to the present invention.
Figure 2:
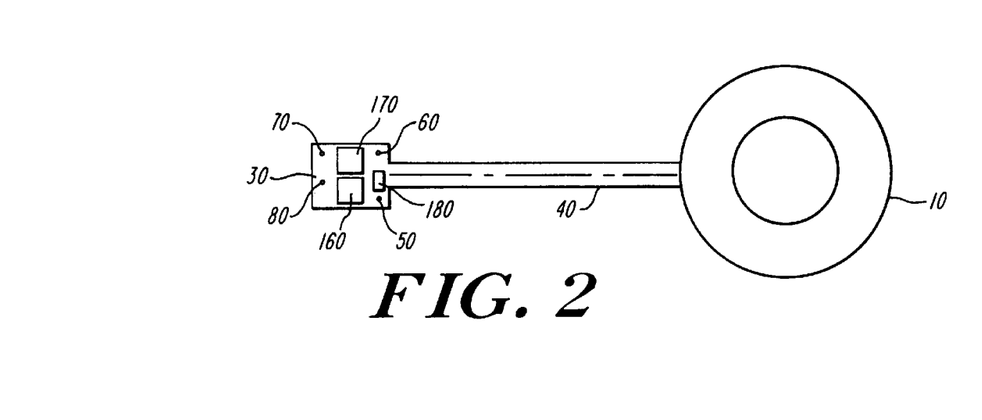
FIG. 2 is an end view of a night vision device intensifier tube incorporating variable gain according to the present invention.
Figure 3:
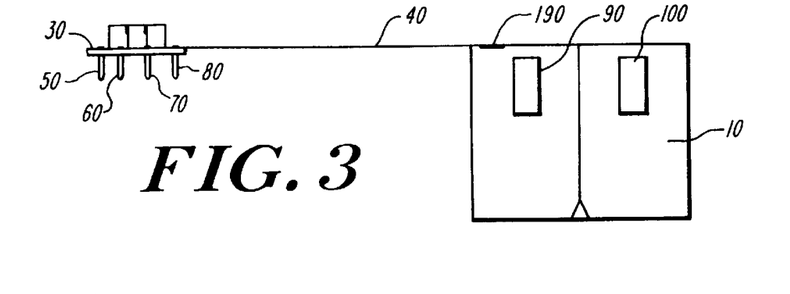
FIG. 3 is a top view of a night vision device intensifier tube incorporating variable gain according to the present invention.

More particularly, referring now to the figures, wherein like references correspond to like components, FIG. 1 shows a perspective view of the first embodiment of this invention. FIG. 1 illustrates the intensifier tube housing 10 coupled to potentiometer board 30 (via interconnecting wires 20). Referring now also to FIG. 2, an end view of a second embodiment of the present invention can be seen therein having the intensifier tube housing 10, interconnecting flexible circuit 40, potentiometer board 30, and connector pins 50, 60, 70, 80. The pins 50, 60, 70 and 80 in turn mate with a circuit in the system which includes the user-accessible gain control, such as a dial or any other suitable means for allowing a user to adjust the variable gain of the night vision device.

The DC operating power for the tube 10 is supplied in the normal way for MX-10160 and related tubes for example. That is, the power is supplied through two contacts 90, 100 on the outer surface of the tube housing 10. The positive contact is formed by a conductive area or conductive contact tab. In tubes which incorporate a shielded housing, the shield typically forms the negative contact. In tubes which do not require a shielded housing, the negative contact consists of another conductive area or conductive contact tab like the positive contact. Alternatively, power could be supplied using any conventional technique well known to those skilled in the pertinent art.

Inside the tube housing 10 are an intensifier tube module and a power supply, potted into the housing to provide electrical insulation and mechanical support. The intensifier tube module is identical, for example, to those used in similar fixed-gain systems.

Figure 5:
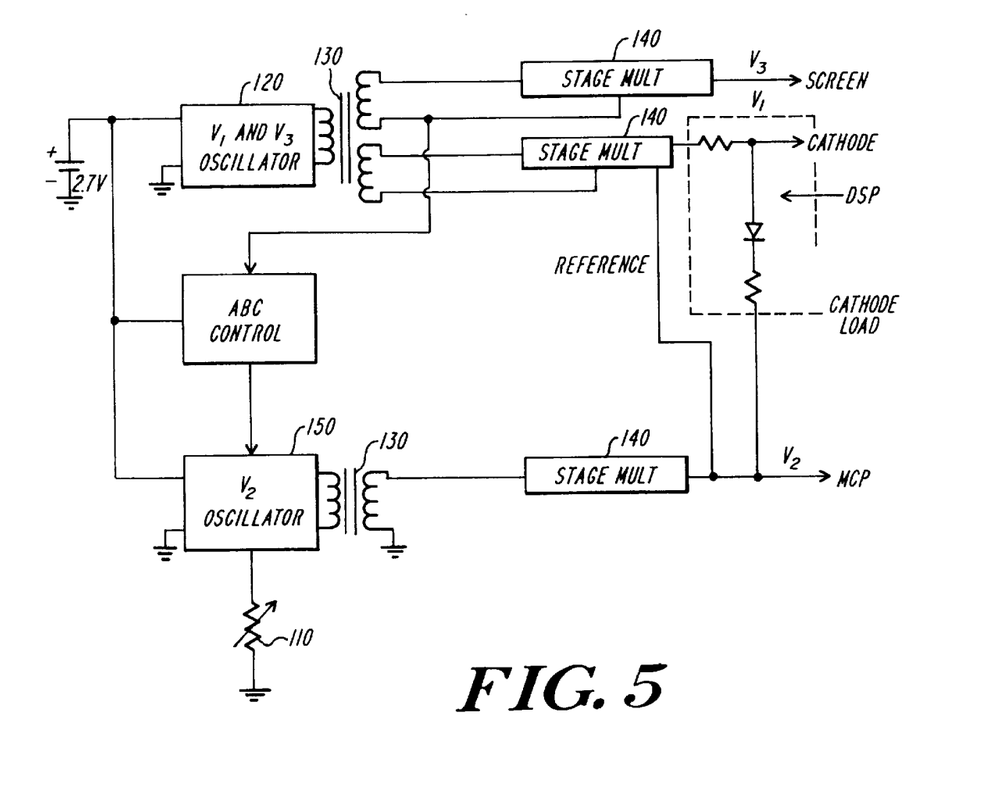
FIG. 5 is a block diagram of a typical power supply for a night vision device.

Referring now also to FIG. 5, the power supply is also very similar to the power supply used in fixed-gain systems, except that the factory-adjustable gain control potentiometer 110 is left out and the external tethered potentiometer board 30 is coupled in its place as illustrated in FIG. 6.

The power supply, for example, operates by a conventional chain of oscillator 120, step-up transformer 130 and multistage voltage doubler networks 140. Frequently two oscillators are present (120 and 150). Oscillator 120 supplies a positive screen voltage and a cathode voltage, while oscillator 150 supplies a variable MCP voltage. The power supply preferably also provides automatic brightness control (ABC) and bright source protection (BSP).

Automatic brightness control is accomplished by automatic control of the microchannel plate voltage. The ABC action holds the maximum output brightness in the range of 0.3 to 3 fL for example, depending on the maximum output brightness and tube life requirements. Bright source protection is accomplished by reduction of the cathode voltage above a certain photocathode current level. At very high photocathode illumination levels, image transmission is ensured by holding the cathode voltage at a level of a few volts.

Figure 4:
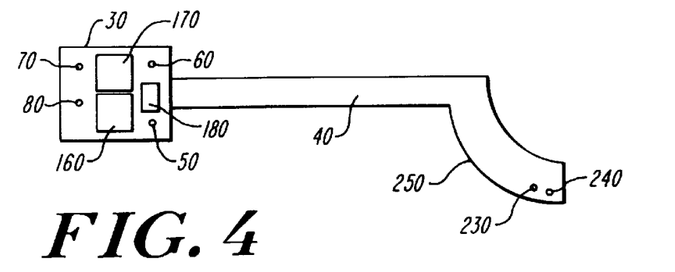
FIG. 4 is an end view of a potentiometer board and attachment flexible circuit according to the present invention.

Referring now again to FIGS. 2 and 4 also, the external tethered potentiometer board 30 contains two gain-limit potentiometers 160, 170, and a fixed resistor 180 and is located external to the tube housing 10. As discussed, this board is tethered to the tube housing 10 by wires 20 in the first embodiment and by a flexible printed circuit board 40 in the second embodiment. (See FIGS. 1–4).

In the first embodiment, the wires 20 attach to the printed circuit board of the power supply within the intensifier tube housing 10 in the area vacated by the original MCP voltage adjust potentiometer 110, located within the oscillator 150 corresponding to the MCP, and emerge directly from the potting of the tube housing 10.

In the second embodiment, a two-pin header is installed in the power supply in the area vacated by the original MCP voltage adjust potentiometer 110 located within the oscillator 150 corresponding to the MCP. During the assembly of the tube 10, the flexible printed circuit board assembly 40 is soldered to the pins, and the connection is then covered by the backplate 12 of the tube 10. Alternatively, the power supply could contain sockets instead of the header and the flexible printed circuit board 30 could plug into these sockets.

In any of these implementations, the variable gain image intensifier assembly, including the potentiometer board 30 and the tube housing 10 is such that the entire assembly is replaced and the preset gain limits remain with the tube 10 when the tube 10 is replaced, by maintainers for example.

In the present invention, the potentiometer board 30 further plugs into a circan be folded close to the tube housing 10 during assembly of the system. This characteristic eases the installation and removal of the replaceable variable gain image intensifier assembly. The wires or flexible circuit emerge from a relief notch 190 in the tube housing 10, at a particular angle from a standard alignment notch 200 on the tube housing 10 (see FIG. 1). This arrangement is to assure that the wires 20 or flexible circuit 40 can pass through a relief notch 210 in the system housing 220 when the tube 10 is installed or removed. The length of the wires 20 or flexible circuit arm 40 exceeds the length of the tube housing 10 so that the potentiometer board 30 will not interfere when the tube 10 is installed in the system housing 220.

Figure 7:
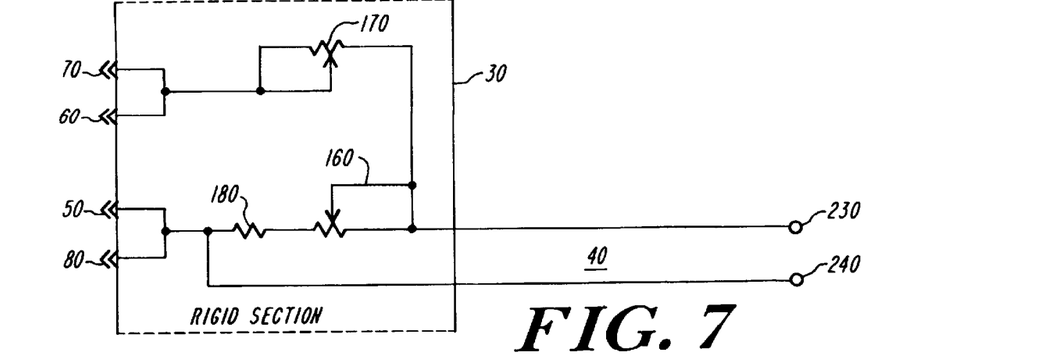
FIG. 7 is a circuit diagram of a potentiometer board according to the present invention.

FIG. 7 presents a schematic diagram of a preferred embodiment of an electrical circuit located on the potentiometer board 30 according to the present invention. The schematic diagram of an alternative embodiment of the present invention is identical, with the flex arm 40 replaced by wires 20 and the four pins 50, 60, 70, 80 replaced by the two-pin header (including pins 50 and 60 for example). As discussed, this circuit, and additional components in the system, replaces the MCP voltage adjustment potentiometer 110 that was originally in the standard power supply for the MX 10160 tube. The points, "low" 230 and "high" 240, are electrically connected at the position the original potentiometer 110 occupied. In the circuit, the potentiometer labeled 170 is used to factory-set the minimum gain limit of the tube. The minimum gain limit is set by connecting a short circuit between the pin 60, 70 pair and the pin 50, 80 pair, and then adjusting the potentiometer 170, to establish the desired minimum gain. The short circuit represents the minimum resistance of the external circuit in the night vision system, when the user's gain adjustment control is adjusted to minimum.

The maximum gain limit is set by connecting a resistor of a defined fixed value (preferably 174 kilo-ohms for example) between the pin 60, 70 pair and the pin 50, 80 pair, and then adjusting the potentiometer 160, to establish the desired maximum gain. The fixed resistance represents the maximum resistance of the external circuit in the night vision system, when the user's gain adjustment control is adjusted to maximum.

The potentiometer board also contains the fixed resistor 180, which is connected in series with potentiometer 160 to establish the desired adjustment range, allowing full use of the available adjustment range of potentiometer 160, for ease of gain setting, but retaining enough adjustment range to allow all combinations of power supplies and tube modules to be set up to the same gain limits.

In a particularly preferred embodiment, potentiometer 160 is a 500 K ohm potentiometer, potentiometer 170 is a 200 K ohm potentiometer and resistor 180 is a 182 K ohm resistor. In this arrangement of potentiometers, there is some interaction between the settings of potentiometers 160 and 170.

Figure 8:
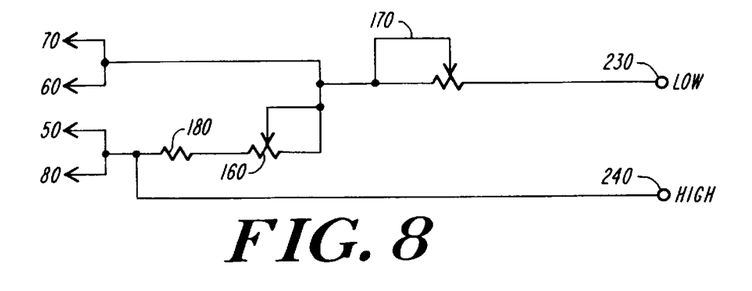
FIG. 8 is a circuit diagram of a first alternative embodiment of the potentiometer board according to the present invention.
Figure 9:
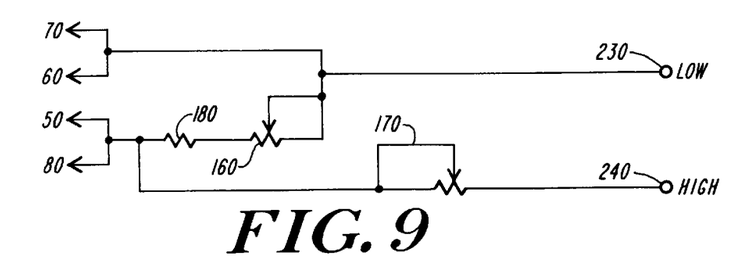
FIG. 9 is a circuit diagram of a further alternative embodiment of the potentiometer board according to the present invention.

Referring now to FIGS. 8 and 9, alternatively, the potentiometer 170, could be placed electrically in series with either the "high" 240 or "low" 230 connections. These alternative arrangements eliminate the interaction of the maximum gain adjustment on the minimum gain adjustment, but also changes the overall adjustment range and alters the relationship between the user's gain control setting and the gain produced.

Potentiometers 160 and 170 are preferably screwdriver-adjust potentiometers, surface-mounted to the rigid section of the potentiometer board 30. Resistor 180, is preferably a fixed, surface-mount, resistor mounted also to the rigid section of the circuit. The electrical connections are preferably formed of etched copper traces bonded to the flexible support material, which preferably is polyamide. The flexible section preferably overlaps and is bonded to a rectangle of rigid board which serves as the support for the pins which connect to the system, and for the components. The four pins 50, 60, 70, 80 are used, for example, to provide improved mechanical support and to improve electrical reliability, such that any one connection can be open without affecting the operation of the circuit. Pin 80, is preferably offset from the rectangular pattern of the others, pins 50, 60, 70, to prevent the board from being plugged backwards into the system. The pins are preferably connected electrically such that a backwards connection would not alter the function of the circuit, but the offset pin assures that all systems are assembled and reassembled in the same physical configuration, and prevents any confusion, for the assemblers and maintainers for example. The curved section 250 of the flexible arm 40 (see FIG. 4 for example) is inside the tube housing 10 behind the backplate upon completion of the tube assembly. The curved section 250 establishes the proper angle between the point of emergence 190 of the flexible arm and the points of attachment to the power supply pins. In this way, the power supply connections to the tube housing 10 for input power are located in the proper position with respect to the power contacts 90 and 100, and the flexible arm 40 along with the tube housing 10 can easily slide into the system housing 220. To install the tube 10 in the system, housing 220 the flexible arm 40 is folded alongside the tube housing 10 and this assembly is slid into the system housing 220, as the flexible arm aligns with a relief notch 210 in the system housing 220 to allow passage.

In addition to the potentiometers external to the tube housing 10, the tube power supply preferably contains at least one other potentiometer, which is used to set the automatic brightness control level for the tube. This potentiometer is the same as in the fixed-gain versions of the power supply, and this aspect of the tube design is unaltered by this invention. As the gain is reduced by the user in this invention, the ABC circuit continues to take control of the gain whenever the input light level times the set gain exceeds the preset ABC output level. However, the variable gain adjustment capability provided by this invention permits the user to reduce the gain in most high input light conditions, such that the ABC threshold is never reached. Some users find the gain variations produced by the ABC circuit to be annoying or distracting, and find the ABC preset output level to be too bright in some situations. The ability to override the ABC by manually reducing the gain setting adds desirable functionality to the system.

This variable gain tube can be applied in any military or commercial night vision systems where variable gain is needed, such as monoculars, binoculars, bi-oculars, and weapon sights. This tube is especially applicable when tube interchangeability, defined gain limits, small size, and light weight are important characteristics.

Figure 10:
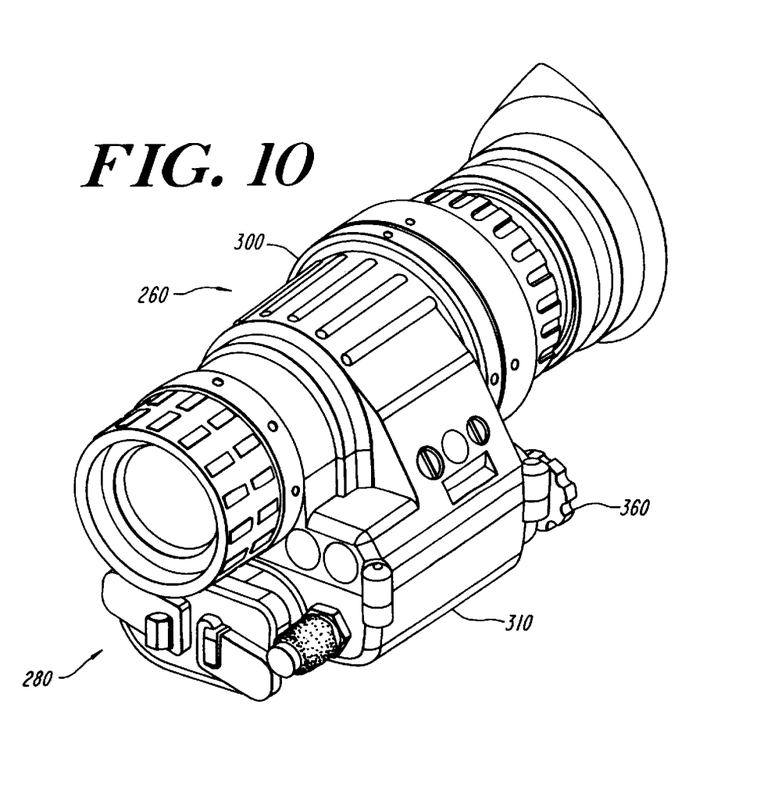
FIG. 10 is a perspective view of a night vision device which utilizes the variable gain image intensifier assembly according to the present invention.

Referring now to FIGS. 10–12 which illustrate a particularly preferred embodiment, the variable gain image intensifier tube according to the present invention in incorporated into an NIGHT VISION MONOCULAR DEVICE 100 according to U.S. Pat. No. 5,943,174, entitled NIGHT VISION MONOCULAR DEVICE, issued Aug. 24 1999, which is incorporated by reference herein.

The monocular night vision device ("MNVD") 260 incorporates numerous enhancements over previously designed systems. This MNVD 260 is compact, lightweight, and comfortably fits into a user's hand. The device can be hand held, head or helmet mounted, or mounted onto a weapon such as a rifle. These capabilities provide a versatile monocular night vision device with a wide variety of usage modes.

The MNVD 260 includes an image intensifier assembly according to the present invention which comprises a tube 10 (see FIG. 1) and potentiometer board 30 which provide the capability for the tube gain to be varied by the user. The potentiometer board 30 is coupled via the flex circuit 40 and with the four pin connectors 50, 60, 70 and 80, further it is positioned external to the image intensifier tube 10.

External Gain Control knob 270 extends from the front 280 of the MNVD 260 and allows a user to variably adjust potentiometer 290 and hence the gain of the image intensifier tube 10, to the desired level for optimal performance.

The main body of the monocular night vision device 260 consists of an upper housing 300 and lower housing 310. The upper and lower housing are separated along the optical axis of the system. The upper housing 300 holds the image intensifier tube 10. The lower housing 310 holds the electronics 320.

The electronics 320 includes a printed circuit board (PCB) assembly 330 (see FIGS. 11 and 12) fastened directly thereto. Several interfacing electrical components are located on the upper side of the PCB. Also on the PCB are conventional AN/AVS-6 tube contacts 340 which provide electrical connection to the pads 90 and 100 and hence the image intensifier tube 10.

The lower housing 310 further contains a second flex circuit assembly 350 which provides for electrical contact between system components. This flex circuit assembly 350 electrically connects standard rotary switch 360 as employed in the AN/PVS-7 system with the battery power supply. This switch provides the following controls: OFF/SYSTEM ON/MOMENTARY IR ON/LOCKED IR ON. The switch is electrically coupled to potentiometer 290 for user adjustment of the image intensifier's gain level. As discussed, the potentiometers 160 and 170 on the potentiometer board 30 set the maximum and minimum gain achievable by a user through adjustment of the potentiometer 290 by using the external gain control knob 270.

The PCB 330 preferably also includes sockets 370, 380, 39 and 400 for respectively receiving pins 50, 60, 70 and 80 and electrically coupling the potentiometer board 30 to the PCB 330.

Although the invention has been described in specific forms with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. In a night vision device including an image intensifier tube having a given life expectancy, and being subjected to factory calibration for providing an optimum output during operation, wherein said calibration undesirably differs from tube to tube and is adjustable by at least one variable resistor coupled to the tube, whereby when one tube is substituted for another, said difference in calibration causes non-optimal performance, a method for providing a user adjustable variable gain for said night vision device such that said variable gain is substantially insensitive to tube substitutions, comprising the steps of:

determining a minimum gain limit and maximum gain limit associated with said optimum output of said night vision device;

substituting said at least one variable resistor with a gain limiting circuit, and factory calibrating said second gain limiting circuit according to said minimum and maximum gain limits, wherein said gain limiting circuit and corresponding gain limits are associated with said image intensifier tube; and, tethering said gain limiting circuit to said image intensifier tube.

2. The method of claim 1, wherein, said gain limiting circuit is tethered external to said image intensifier tube; and, when said image intensifier tube is replaced by another, said gain limiting circuit is also replaced.

3. The method of claim 2, wherein said gain limiting circuit is tethered to said image intensifier tube flexibly.

4. The method of claim 3, wherein said gain limiting circuit includes:
   a first input and a second input;
   a first output and a second output;
   a first potentiometer and a second potentiometer; and,
   resistive means for providing electrical resistance.

5. The apparatus of claim 4, wherein said first potentiometer and said resistive means are coupled in series between said second input and said first output.

6. The apparatus of claim 5, wherein said first potentiometer is adjustable to set said maximum gain limit.

7. The apparatus of claim 5, wherein said second potentiometer is coupled between said first input and said first output.

8. The apparatus of claim 7, wherein said second potentiometer is adjustable to set said minimum gain limit.

9. The apparatus of claim 7, wherein said second input is directly coupled to said second output.

10. The apparatus of claim 4, wherein said resistive means is coupled in series between said second input and said first potentiometer.

11. The apparatus of claim 10, wherein said second potentiometer is coupled to said first output.

12. The apparatus of claim 11, wherein said second potentiometer is further directly coupled to said first input and said first potentiometer.

13. The apparatus of claim 12, wherein said second output is directly coupled to said second input.

14. The apparatus of claim 11, wherein said second potentiometer is further directly coupled to said second input.

15. The apparatus of claim 14, wherein first input is directly coupled to said first output.

16. The apparatus of claim 4, wherein a gain control potentiometer, for adjusting said user adjustable variable gain, is coupled to said first and second outputs.

17. The apparatus of claim 4, wherein said resistive means has a value of approximately 182 kilo-ohms, said first potentiometer has a value of approximately 500 kilo-ohms, and said second potentiometer has a value of approximately 200 kilo-ohms.

18. In a night vision device including an image intensifier tube having a given life expectancy, and being subjected to factory calibration for providing an optimum output during operation, wherein said calibration undesirably varies from tube to tube and is adjustable by at least one variable resistor coupled to the tube and preset at the factory, whereby when one tube is substituted for another, said difference in calibration causes non-optimum performance, a method for providing a user adjustable variable gain for said night vision device, said variable gain being substantially insensitive to tube substitutions, comprising the steps of:
   determining a minimum gain limit and a maximum gain limit associated with said optimum output of said night vision device; and,
   substituting said at least one variable resistor with a gain limiting circuit, and tethering gain limiting circuit to said image intensifier tube, to enable factory calibration of said image intensifier tube according to said minimum and maximum gain limits;
   wherein, when said image intensifier tube is replaced by another, said gain limiting circuit is also replaced.

19. The method of claim 18, wherein said gain limiting circuit is positioned external to said image intensifier tube within said night vision device.

20. The method of claim 19, wherein when said image intensifier tube is replaced by another, said gain limiting circuit remains with said night vision device.

* * * * *